US007165397B2

(12) United States Patent
Raszga et al.

(10) Patent No.: US 7,165,397 B2
(45) Date of Patent: Jan. 23, 2007

(54) ANTI-STALL PILOT PRESSURE CONTROL SYSTEM FOR OPEN CENTER SYSTEMS

(75) Inventors: Calin L. Raszga, Woodstock (CA); Jeffrey R. Girard, Woodstock (CA); Ulf Bergquist, Woodstock (CA)

(73) Assignee: Timberjack, Inc., Woodstock (CA)

( * ) Notice: Subject to any disclaimer, the term of this patent is extended or adjusted under 35 U.S.C. 154(b) by 79 days.

(21) Appl. No.: 10/984,051

(22) Filed: Nov. 9, 2004

(65) Prior Publication Data

US 2005/0160904 A1 Jul. 28, 2005

Related U.S. Application Data

(60) Provisional application No. 60/518,956, filed on Nov. 10, 2003.

(51) Int. Cl.
*F16D 31/02* (2006.01)

(52) U.S. Cl. .......................................... 60/431; 60/422

(58) Field of Classification Search .................. 60/422, 60/431

See application file for complete search history.

(56) References Cited

U.S. PATENT DOCUMENTS 3,533,230 A 10/1970 Draper
3,783,611 A 1/1974 Bojas
3,891,354 A 6/1975 Bosch
4,015,482 A 4/1977 Ito et al.
4,185,521 A 1/1980 Beals
4,559,778 A 12/1985 Krusche
4,596,118 A 6/1986 Heiser
4,637,482 A 1/1987 Ohashi et al.
5,303,551 A 4/1994 Lee
6,192,681 B1 * 2/2001 Tsuruga et al. ............... 60/452
6,220,028 B1 4/2001 Ishikawa et al.
6,305,419 B1 * 10/2001 Krieger et al. ................ 60/431
6,666,023 B2 12/2003 Nagura et al.

* cited by examiner

*Primary Examiner*—F. Daniel Lopez
(74) *Attorney, Agent, or Firm*—Quarles & Brady LLP

(57) ABSTRACT

A hydraulic control system has a pilot pressure supply circuit that applies a pressure differential dependent on engine speed to opposite sides of an anti-stall valve to turn off the pilot flow when the pressure differential falls below a certain value, resulting in holding the positions of the hydraulic devices being controlled until engine speed recovers.

13 Claims, 1 Drawing Sheet

10

26
28
46
48
30
34
20
36
42
50
52
38
22
24
54
44
12
16
14
40

ANTI-STALL PILOT PRESSURE CONTROL SYSTEM FOR OPEN CENTER SYSTEMS

CROSS-REFERENCE TO RELATED APPLICATION

This claims the benefit of U.S. Provisional Patent Application No. 60/518,956 filed Nov. 10, 2003.

STATEMENT CONCERNING FEDERALLY SPONSORED RESEARCH OR DEVELOPMENT

Not applicable.

FIELD OF THE INVENTION

This invention relates to hydraulic control systems, and in particular to such systems in which a single prime mover is used to power one or more hydraulic pumps to supply multiple hydraulic loads.

BACKGROUND OF THE INVENTION

Many types of modern hydraulic machines, including forestry machines, excavators, earth moving machinery, and material handlers feature a variety of hydraulic functions. Each function may be controlled separately, but all may receive their energy from a single prime mover, such as a diesel or gasoline engine. Because it is very unlikely that all these functions will all demand full power simultaneously, it is common for the machine designer to select a prime mover of less power than the total possible hydraulic power consumption.

The designer is faced with a dilemma in selecting the relationship between engine power and installed hydraulic power consumption. If the engine is large enough to cover even very unlikely combinations of multiple hydraulic functions, the machine will be excessively expensive to build and to operate. If the engine is too small, some combinations of multiple functions will exceed the available power. This will cause the engine to slow, or even stall. This leads to a decrease in production, increased wear on the engine, and operator frustration. This dilemma is made worse by the fact that individual machines will operate in differing conditions, with differing loads, and with operators of differing skills and expectations.

Decreasing hydraulic load when engine capacity is exceeded has been tried in various forms. Most systems decrease pilot flow, destroke a variable output pump or otherwise reduce the hydraulic load when pilot pressure drops due to a decrease in engine speed and thus a decrease in the speed of the pilot pump. Other systems decrease hydraulic power demand of a main pump when secondary controls are activated, which is intended to prevent the total hydraulic load from becoming large enough to stall the engine.

Typical systems decrease, without completely eliminating, the hydraulic power demanded by the pilot valves. If the manual input is held constant or increased when engine speed drops, the engine may continue to operate at a lower speed. This results in decreased fuel efficiency, increased engine wear, continued decreased hydraulic power, and may eventually lead to engine stall.

SUMMARY OF THE INVENTION

The invention provides a hydraulic control system that automatically reduces or eliminates the hydraulic load on the prime mover in response to the capacity of the prime mover being overcome by the hydraulic load. The invention accomplishes this in the preferred embodiment by hydraulically sensing a certain reduction in the speed of the prime mover, and in response thereto metering by relieving the pilot pressure that controls the main hydraulic functions.

The invention thereby provides quick, smooth, and potentially total removal of hydraulic load on the prime mover while holding the positions of the hydraulic functions when engine speed drops, plus quick, smooth, and total return of hydraulic load and functions when the engine speed recovers. This enables a machine designer to select an engine size that will be efficient for most operations, without concerns for occasional different or combined operations to produce engine speed decreases and stalls.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
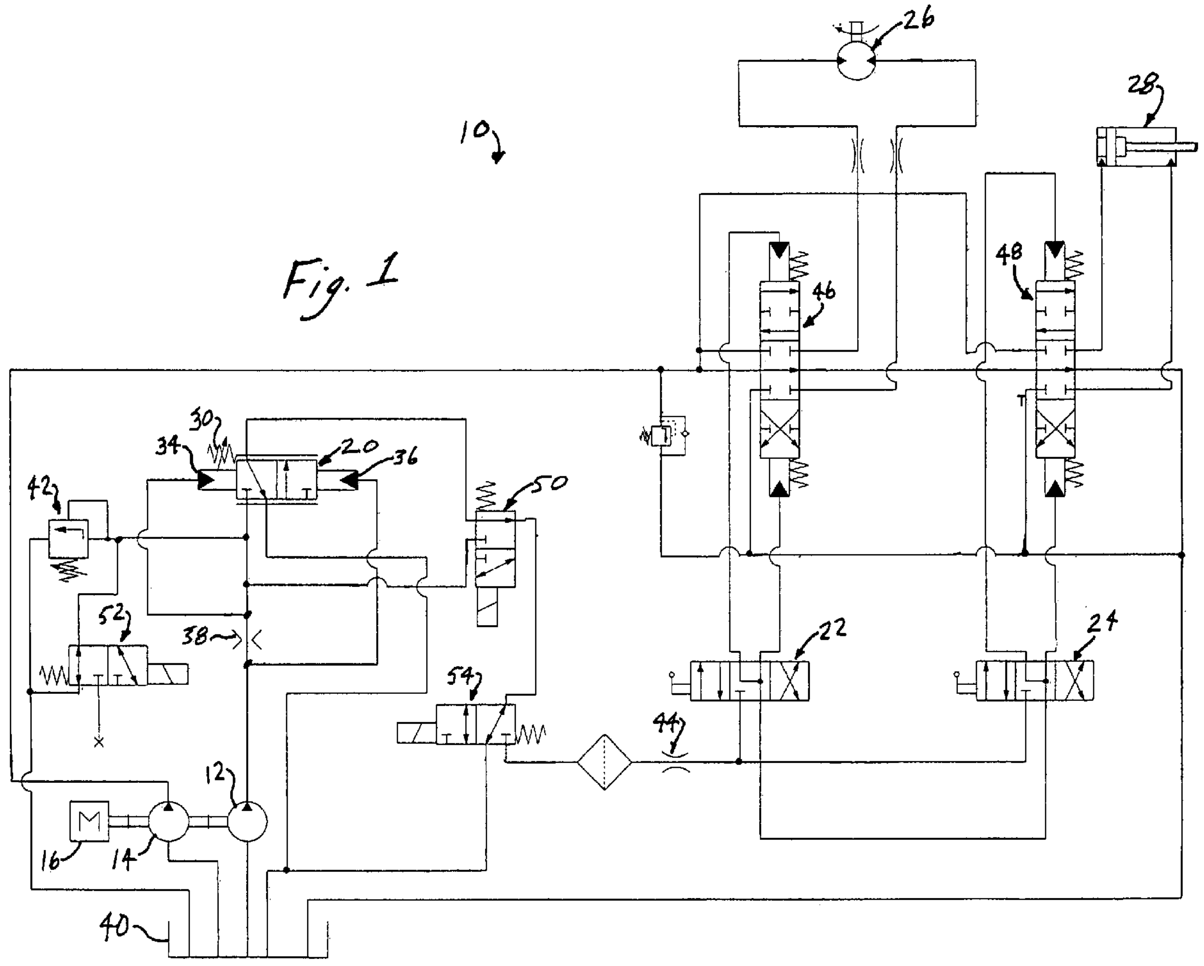
FIG. 1 is schematic view of a hydraulic control system of the invention.

Referring to FIG. 1, a hydraulic control circuit 10 of the invention is illustrated. An engine driven pump 12 is a fixed displacement pilot pressure pump and an engine driven pump 14 is a main pump that supplies the various functions operated by the circuit 10. As illustrated, the main pump 14 is driven by the same prime mover 16 as the pump 12.

In the position illustrated, a pilot operated three way two position anti-stall valve 20 is in its at-rest position, wherein pilot flow to the main hydraulic circuit is stopped and pilot flow from the main hydraulic circuit (from the joysticks 22, 24) is vented to tank (with valve 54 in its normal actuated position). When valve 20 is shifted leftwardly from the position illustrated, into its normal operating position, it supplies pilot flow to the joysticks 22,24 that are used to control the multiple hydraulic functions, one function being a hydraulic motor 26 and another being a hydraulic actuator 28. Any number of hydraulic work devices 26, 28 could have been illustrated, two being adequate to describe the invention. The stall valve 20 is biased, and in the absence of pressure at port 36 sufficient to overcome the pressure at port 34 is held, in this position by the balance of spring force, which is preferably adjustable as illustrated by adjustable spring 30. The difference in pressures applied to the two pilot pressure ports 34, 36 at opposite ends of the valve 20 controls the position of and opening through the valve 20. The ports 34, 36 are connected to opposite sides of an orifice 38 through which passes the pilot flow from pump 12, which is normally directed to the joysticks 22, 24 and over relief valve 42. Thus, the differential pressure across orifice 38 is directly proportional to the pilot flow to the main circuit, and therefore to the speed of engine 16.

If the demanded hydraulic power (load) exceeds the available engine power (capacity), the torque demands of the main pump 14 will slow the engine 16. This decreases the pilot flow produced by pump 12, and thus decreases the pressure drop across the orifice 38. When this differential pressure is no longer large enough to overcome the bias of spring 30, the anti-stall valve 20 will switch to its at-rest position. In this position, all pilot pump 12 flow is directed to the tank 40 through relief valve 42, and the pressure in the downstream pilot control circuits is also dumped to the tank 40, through the damping orifice 44. This forces all the open center multi-section valves 46, 48 to gradually return to the mid-position, in which the hydraulic lines from the hydraulic devices being operated are blocked and therefore held in position. This smoothly stops all hydraulic motion of the motor 26 and actuator 28, and decreases the load on the engine 16 produced by the main pump 14.

When the engine speed recovers sufficiently, the increased pilot flow through the orifice 38 allows the pressure differential on the anti-stall valve 20 to overpower the spring 30. The valve 30 returns to the normal position, and pilot control flow, controlled by joysticks 22, 24, returns smoothly to the control valves 46, 48, through the damping orifice 44. This will modulate in this manner to signal the operator to adjust the joysticks to reduce the hydraulic demands on the prime mover and therefore return to continuous operation at near capacity.

The force of the spring 30 in the anti-stall valve 20 can preferably be adjusted so as to vary the engine speed at which the valve 20 actuates from the operating to the at-rest position. An electrically operated override valve 50 is provided to allow the operator to disable the anti-stall feature, when desired by actuating the valve 50, for example when the operator desires to run the engine at less than full speed. Electrically operated safety valves 52, 54 may also be provided that when in operation are on, but that relieve pilot pressure when they are off.

A preferred embodiment of the invention has been described in considerable detail. Many modifications and variations to the preferred embodiment described will be apparent to a person of ordinary skill in the art. Therefore, the invention should not be limited to the embodiment described.

We claim:

1. In a hydraulic control system that has hydraulic pilot pressure operated valves for controlling hydraulic work devices and a prime mover that drives a hydraulic pump that supplies hydraulic fluid under pressure to the devices through the pilot pressure operated valves, the improvement comprising an orifice in a hydraulic line in which the fluid flow is dependent on prime mover speed and a spring return pilot pressure operated anti-stall valve in a pilot pressure fluid supply line, the anti-stall valve having opposed pilot pressure ports, one of said ports being connected to one side of said orifice and the other said port being connected to the other side of said orifice, such that a sufficient reduction in the speed of the prime mover causes the pressure drop across the orifice to diminish to a point that the anti-stall valve reduces the pilot pressure fluid flow through the anti-stall valve to the pilot pressure operated valves of the hydraulic control system and relieves the pilot pressure from the pilot pressure operated valves.

2. The improvement of claim 1, further comprising an override valve that can be actuated by art operator to bypass the anti-stall valve.

3. The improvement of claim 1, further comprising a damping orifice in the pilot pressure supply line downstream of the anti-stall valve.

4. The improvement of claim 1, wherein the system redirects pilot flow from the pilot pressure operated valves to tank when the prime mover speed is sufficiently diminished to actuate the anti-stall valve.

5. The improvement of claim 4, wherein the system includes a relief valve, in communication with the pilot pressure supply line upstream of the anti-stall valve, that opens when the anti-stall valve turns off so as to redirect pilot flow to tank.

6. The improvement of claim 1, further comprising at least one control valve in communication with the pilot pressure supply line between the anti-stall valve and the pilot pressure operated valves.

7. The improvement of claim 1, wherein the pilot pressure operated valves stop and hold the position of the hydraulic work devices they control when pilot pressure is relieved from them.

8. The improvement of claim 7, wherein the pilot pressure operated control valves are three position valves.

9. The improvement of claim 8, wherein the pilot pressure operated control valves are open center valves.

10. The improvement of claim 1, wherein the anti-stall valve is a three way valve.

11. The improvement of claim 10, wherein the anti-stall valve is a two position valve.

12. In a hydraulic control system that has hydraulic pilot pressure operated valves for controlling hydraulic work devices and a prime mover that drives a hydraulic pump that supplies hydraulic fluid under pressure to the devices through the pilot pressure operated valves, the improvement comprising an anti-stall valve in a pilot pressure fluid supply line that supplies pilot pressure fluid to the pilot pressure operated valves, the anti-stall valve being responsive to a reduction in speed of the prime mover such that at full speed of the prime mover the anti-stall valve directs pilot pressure fluid flow to at least one control valve that controls at least one pilot pressure of the pilot pressure operated valves and at a reduced speed of the prime mover the anti-stall valve reduces the flow of pilot pressure fluid directed to the control valves and relieves the pilot pressure from the control valves and an override valve that can be actuated by an operator to bypass the anti-stall valve.

13. In a hydraulic control system that has hydraulic pilot pressure operated valves for controlling hydraulic work devices and a prime mover that drives a hydraulic pump that supplies hydraulic fluid under pressure to the devices through the pilot pressure operated valves, the improvement comprising an anti-stall valve in a pilot pressure fluid supply line that supplies pilot pressure fluid to the pilot pressure operated valves, the anti-stall valve being responsive to a reduction in speed of the prime mover such that at full speed of the prime mover the anti-stall valve directs pilot pressure fluid flow to at least one control valve that controls at least one pilot pressure of the pilot pressure operated valves and at a reduced speed of the prime mover the anti-stall valve reduces the flow of pilot pressure fluid directed to the control valves and relieves the pilot pressure from the control valves and a damping orifice in the pilot pressure fluid supply line downstream of the anti-stall valve.

* * * * *